(12) United States Patent
Knoll et al.

(10) Patent No.: US 6,399,727 B1
(45) Date of Patent: Jun. 4, 2002

(54) HETEROLEPTIC ALKALINE-EARTH METAL COMPOUNDS AND METHODS FOR CARRYING OUT STEREOSELECTIVE ANIONIC POLYMERIZATION

(75) Inventors: Konrad Knoll, Ludwigshafen; Hans-Herbert Brintzinger, Tägerwilen; Sjoerd Harder, Constance; Armin Weeber, Markdorf; Florian Feil, Constance, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/913,993

(22) PCT Filed: Feb. 21, 2000

(86) PCT No.: PCT/EP00/01406

§ 371 (c)(1),
(2), (4) Date: Aug. 21, 2001

(87) PCT Pub. No.: WO00/50468

PCT Pub. Date: Aug. 31, 2000

(30) Foreign Application Priority Data

Feb. 25, 1999 (DE) .......................................... 199 08 079

(51) Int. Cl.$^7$ .............................. C08F 4/50; C08F 12/08
(52) U.S. Cl. ...................... 526/190; 526/183; 526/346; 502/152; 502/155; 502/156; 556/1; 556/7; 556/9; 556/11; 556/13; 556/19; 260/665 R
(58) Field of Search ................................. 526/183, 190, 526/346; 556/1, 11, 19, 7, 9, 13; 502/152, 155, 156; 260/665 R

(56) References Cited

U.S. PATENT DOCUMENTS 3,965,080 A 6/1976 Hargis
4,012,336 A 3/1977 Hargis

FOREIGN PATENT DOCUMENTS

DE 197 54504 6/1999
EP 535 582 4/1993

OTHER PUBLICATIONS

Russian Chem.Review, 50(6), 1981, Yakubovich, 601–614.
J.Org.Met.Chem., Westerhausen et al., 541 (1997) 261–268.
J.Mac.Sci.Chem.A9 (4), 575–596 (1975) Nakhmanovich et al.
Org. 1994, 13,2773–2786, Burkey et al.
J.Am.Chem.Soc.1994, 116, 2409–2417, Tesh et al.
J.Am.Chem.Soc.77 (1955) 1708, Natta et al.

Primary Examiner—Fred Teskin
(74) Attorney, Agent, or Firm—Keil & Weinkauf

(57) ABSTRACT

Polymerization initiator comprising an alkaline earth metal compound chosen from the group a) of heteroleptic alkaline earth metal compounds of the formula I $$L—M—R \qquad (I)$$

or b) of cationic alkaline earth metal complexes of the formula II $$[D→M—R]^+X^- \qquad (II),$$

where
M: is Ca, Sr or Ba,
L: is a polymerization-inactive ligand,
R: is a polymerization-active ligand,
D: is a donor ligand, and
X: is a non-coordinating anion, and processes for the preparation of the polymerization initiators and processes for anionic polymerization in the presence of the polymerization initiators.

10 Claims, No Drawings

HETEROLEPTIC ALKALINE-EARTH METAL COMPOUNDS AND METHODS FOR CARRYING OUT STEREOSELECTIVE ANIONIC POLYMERIZATION

The invention relates to a polymerization initiator comprising an alkaline ear th metal compound chosen from the group a) of heteroleptic alkaline earth metal compound s of the formula I

L—M—R          (I)

or b) of cationic alkaline earth metal complexes of the formula II

[D→M—R]$^+$X$^-$          (II), where
M: is Ca, Sr or Ba,
L: is a polymerization-inactive ligand,
R: is a polymerization-active ligand,
D: is a donor ligand, and
X: is a non-coordinating anion.

The invention further relates to processes for the preparation of the polymerization initiators and processes for anionic polymerization in the presence of the polymerization initiator.

Styrene can be polymerized either free-radically, anionically, cationically or in the presence of metallocene catalysts. Free-radical polymerization initiated thermally or by means of peroxides produces atactic polystyrene.

The preparation of syndiotactic polystyrene in the presence of metallocene catalyst system is known and is described, for example, in detail in EP-A-0 535 582. Because of its crystallinity, syndiotactic polystyrene has a very high melting point of about 270° C., high rigidity and tensile strength, dimensional stability, a low dielectric constant and high chemical resistance. The profile of mechanical properties is retained even at temperatures above the glass transition temperature.

Isotactic polystyrene, obtainable by means of catalysts comprising titanium tetrachloride and alkylaluminum chlorides, has been described by G. Natta et al. in Journal of the American Chemical Society 77 (1955), page 1708. Isotactic polystyrene is crystalline and has a melting point of 240° C. Because of the very slow rate of crystallization, it is unsuitable for industrial applications, e.g. for injection molding.

Anionic and cationic polymerization, like free-radical polymerization, usually also leads to atactic polystyrene. Anionic polymerization has living character and therefore several advantages over free-radical polymerization or polymerization catalyzed by metallocenes. Thus, for example, it is possible to control simply the molecular weight via the ratio of initiator to monomers and the formation of block copolymers. The polymers prepared by the anionic process have a narrow molecular weight distribution and low residual monomer contents.

The anionic polymerization of styrene and butadiene is usually initiated by organolithium polymerization initiators. The anionic polymerization initiation by organobarium compounds is known, for example, from U.S. Pat. Nos. 3,965,080, 4,012,336. The unpublished DE-A 197 54 504 describes an improved process for the preparation of bisorganoalkaline earth metal compounds.

Russian Chemical Reviews, Vol. 50, 1981, p. 601–614 gives an overview of the synthesis methods and the use of organoalkaline earth metals in the anionic polymerization of unsaturated monomers. Some of the known syntheses for organoalkaline earth metals are complex or produce the desired compounds in low yields or contaminated with byproducts.

B. Nakhmanovich et al., Journal of Makromol. Science Chem. A9(4), pages 575 to 596 (1975) describe the random copolymerization of styrene and butadiene with a high cis 1,4-content of the butadiene units.

The stereoselective polymerization of styrene using anionic polymerization initiators has hitherto not been described.

The heteroleptic alkaline earth metal compounds known from Tesh et al. Journal of the American Chemical Society 116 (1994), page 2409 to 2417, and Burkey et al. Organometallics 13 (1994), page 2773 to 2786 are not polymerization-active.

It is an object of the present invention to provide an anionic polymerization initiator which is also stereoselective with regard to the polymerization of styrene. The polymerization initiator was to combine the advantages of anionic and of metallocene-catalyzed styrene polymerization.

It is a further object of the invention to provide a simple and favorable process for the preparation of the polymerization initiators.

We have found that the first object is achieved by a polymerization initiator comprising an alkaline earth metal compound chosen from the group a) of heteroleptic alkaline earth metal compounds of the formula I

L—M—R          (I)

or b) of cationic alkaline earth metal complexes of the formula II

[D→M-R]$^+$X$^-$          (II), where
M: is Ca, Sr or Ba,
L: is a polymerization-inactive ligand,
R: is a polymerization-active ligand,
D: is a donor ligand, and
X: is a non-coordinating anion.

Where appropriate, solvents coordinated to the alkaline earth metal M, such as tetrahydrofuran, or groups carrying heteroatoms in the ligand R are not shown in the formulae (I+II) for simplicity.

We have also found that the second object is achieved by a process for the preparation of the polymerization initiators and processes for anionic polymerization in the presence of the polymerization initiator.

The term heteroleptic alkaline earth metal compound is used to describe one with two different ligands on the alkaline earth metal.

A suitable polymerization initiator is also a mixture of two or more alkaline earth metal compounds of the formula I or II.

The polymerization initiators can additionally comprise alkaline earth metal compounds of the formulae III and IV:

L—M—L          (III)

R—M—R          (IV), where L, M and R are as defined in claim 1.

For the stereoselective anionic polymerization, heteroleptic alkaline earth metal compounds are necessary which have a polymerization-active radical and a second, sterically directing ligand. As a result of ligand exchange, these compounds are in Schlenk equilibrium with the respective homoleptic complexes:

L—M—L+R—M—R ⇌ L—M—R

The position of the Schlenk equilibrium can be determined using the following equation:

$$K = \frac{[L-M-R]^2}{[(L)_2 M] * [(R)_2 M]}$$

Complexes suitable for the stereoselective polymerization must have a Schlenk equilibrium which is predominantly on the side of the heteroleptic complexes and in which the ligand exchange proceeds slowly in relation to the polymerization.

For a stereoselective polymerization, it is advantageous for the proportion of alkaline earth metal compounds of the formula IV to be at most 10 mol %, preferably 0 to 1 mol %, based on the total of all alkaline earth metal compounds.

The polymerization-inactive ligand L generally has a lower basicity than polystyryllithium. The pKa value of the ligand is preferably below 30, in particular below 20.

Examples of suitable polymerization-inactive ligands L are cyclic or open-chain hydrocarbons having a delocalized electron system in which one or more CH fragments can be replaced by isoelectronic fragments, sterically hindered hydrocarbons bonded by heteroatoms, or clusters bonded by a halogen.

Examples of cyclic hydrocarbons having a delocalized electron system are unsubstituted or mono- or polysubstituted cyclopentadienyls, indenyls, fluorenyls, fulvalenediyls or hydropentalenyls. The substituents can be alkyls, preferably $C_1$- to $C_{10}$-alkyl, 5- to 7-membered cycloalkyl, which for its part can carry a $C_1$ to $C_{10}$-alkyl as substituent, $C_6$- to $C_{15}$-aryl or arylalkyl. Other suitable substituents are groups with heteroatoms such as silanes, amines, phosphanes, arsanes, stilbanes. Preferred heteroatom-carrying groups as substituents are trialkylsilyls, in particular trimethylsilyl.

One or more CH fragments of the cyclic hydrocarbons can also be released by isoelectronic N or P or S fragments, e.g. pyrrolyl anion $C_4H_4N^-$, phosphacyclopentadiene $C_4H_4P^-$ or arsacyclopentadiene $C_4H_4As^-$. Suitable polymerization-inactive ligands are also anionic boron heterocycles such as diborolenyl or borinate. Preferred cyclic hydrocarbons are cyclopentadienyl, methylcyclopentadienyl, ethylcyclopentadienyl, n-butylcyclopentadienyl, pentamethylcyclopentadienyl, trimethylsilylcyclopentadienyl, indenyl and fluorenyl.

Two identical or different cyclic hydrocarbons can also be bridged via an alkyl, silyl or phosphoryl group. Preferred bridged cyclic hydrocarbons having a delocalized electron system are (dimethylphenylsilyl)tetramethylcyclopentadienyl.

Examples of open-chain hydrocarbons having a delocalized electron system are anionic 3-, 5- or 7-membered hydrocarbons in which optionally one or more $CH_2$ fragments can be replaced by isoelectronic NR or O, and a CH fragment can be replaced by N or $R_2P$. Preferably, pentadienyl or diphenylalkyls are suitable. Particular preference is given to bis(4-methylbenzylide)diphenylphosphonium. Sterically hindered hydrocarbons bonded via heteroatoms, as polymerization-inactive ligand L, are, for example, sterically hindered alkoxides or phenoxides, amides, sulfides or phosphides. Suitable sterically hindered radicals are tert-butyl, dimethylphenyl, di-tert-butylphenyl, diphenylphenyl.

Suitable as polymerization-active ligand R are ligands with a pKa value above 30, preferably above 40. Preferred polymerization-active ligands are carbanions, for example of the formula $R^1R^2R^3C^-$ or $R^1(R^2R^3C)C^-$, where $R^1$, $R^2$ and $R^3$ can be identical or different radicals and are each hydrogen, alkyls such as methyl, ethyl, n-propyl, isopropyl, n-butyl, isobutyl, tert-butyl, pentyl, hexyl, heptyl, octyl, nonyl, dodecyl, octadecyl, aryls, such as phenyl or substituted phenyls, such as 3,5-dimethylphenyl, p-t-butylphenyl, p-octylphenyl, p-dodecylphenyl, o-, m-, p-tolyl, biphenyl, naphthyl, arylalkyls such as benzyl, phenylethyl, 2-phenylpropyl, 6-phenylhexyl, p-methylphenylethyl, p-t-amylbenzyl, alkenyls, such as vinyl, allyl, 3-butenyl, 4-hexenyl, cycloalkyls such as cyclopropyl, cyclobutyl, cyclopentyl, cyclohexyl, cyclooctyl, cycloalkenyls such as cyclohexenyl or cyclooctenyl. The radicals $R^1$, $R^2$ and $R^3$ can, however, also be $NR^1R^2$, $OR^1$, $SiR^1R^2R^3$, $SR^1$, $PR^1R^2$, where the radicals $R^1$, $R^2$, $R^3$ bonded to the heteroatom are as defined above. The radicals $R^1$, $R^2$ or $R^3$ can also be bonded cyclically with one another and form cycloaliphatic or aromatic rings. The polymerization-active ligands R can also carry functional groups which are inert to the metal-carbon bond. Examples of inert groups are trimethylsilyl, trimethylsiloxy, ether, dialkylamino or cycloalkylamino groups. Preferred polymerization-active ligands are unsubstituted or substituted benzyl, bis(trimethylsilyl)methyl, o,o-dialkylphenyl, allyl or alkenyl.

The polymerization-active ligands R can also be $R^1R^2N^-$ or $R^1R^2R^3Si^-$, where $R^1$, $R^2$ and $R^3$ are as defined above.

The cationic alkaline earth metal complexes of the formula II contain a mono- or polydentate donor ligand D. Examples thereof are mono- or polydentate ethers, thioethers, amines or sulfides. Preference is given to chelate ligands having two or more oxygen or nitrogen atoms, such as pentamethyldiethylentriamine (PMDTA).

Suitable as non-coordinating anion X in formula II are, in principle, all abovementioned polymerization-inactive ligands in the form $L^-$ which have been displaced by the donor ligand D. Other suitable non-coordinating anions are, for example, unsubstituted and halogen- or haloalkyl-substituted tetraphenylborates or carboranates. Examples thereof are tetraphenyl borate, tetra(p-tolyl) borate, tetra(o-tolyl) borate, tetra(o,p-dimethylphenyl) borate, tetra(m,m-dimethylphenyl) borate, tetra(pentafluorophenyl) borate and tetra(p-trifluoromethylphenyl) borate.

The heteroleptic alkaline earth metal compounds can, for example, be prepared by reaction of an alkaline earth metal compound of the formula $R_2M$ with a compound of the formula LH or of the formula $L_2M$, where M, R and L are as defined in claim 1, and H is hydrogen. In the reaction of an alkaline earth metal compound of the formula $R_2M$ with a compound of the formula $L_2M$, the heteroleptic compound formed is in Schlenk equilibrium with the starting compounds. The equilibrium can be controlled by the choice of ligand L.

Preferred alkaline earth metal compounds of the formula $R_2M$ are dibenzylbarium, bis(diphenylmethyl)barium, bis(1,1,3-triphenylpropyl)barium and bis[(2-dimethyl-aminophenyl)(trimethylsilyl)methyl]calcium. To prepare the heteroleptic alkaline earth metal compounds according to the invention, they are preferably reacted with dimethylphenyl(tetramethylcyclopentadienyl)silane, (diethylamino)dimethyl(tetramethylcyclopentadienyl)silane or 9-trimethylsilylfluorene, as compound of the formula LH, or with bis[(dimethylphenylsilyl)tetramethylcyclo-pentadienyl)]barium, bis[(diethylaminodimethylsilyl) tetramethylcyclopentadienyl)]barium, bis[bis(4-methylbenzylide)diphenylphosphonium]barium, bis (pentamethylcyclopentadienyl)barium, bis

[(dimethylphenylsilyl)fluoren-9-yl]barium or bis[(dimethylphenylsilyl)tetramethylcyclopentadienyl]calcium, as preferred alkaline earth metal compounds of the formula L$_2$M.

The polymerization initiators according to the invention are suitable for the polymerization of anionically polymerizable monomers, in particular of vinylaromatic monomers or dienes, but also of acrylates, methacrylates, acrylonitriles or vinyl chloride. For this purpose, the polymerization initiators according to the invention are generally used in amounts in the range from 0.001 to 5 mol %, based on the monomers to be polymerized.

Preferred dienes are butadiene, isoprene, 2,3-dimethylbutadiene, 1,3-pentadiene, 1,3-hexadienes or piperylene or mixtures thereof.

Vinylaromatic monomers which can be used are, for example, styrene, α-methylstyrene, p-methylstyrene, ethylstyrene, tert-butylstyrene, vinyltoluene or 1,1-diphenylethylene or mixtures thereof.

Particular preference is given to using butadiene and styrene.

The polymerization is expediently carried out in an aliphatic or aromatic hydrocarbon or hydrocarbon mixture, preferably in benzene, toluene, ethylbenzene, xylene, cumene or cyclohexane. Particular preference is given to using cyclohexane or toluene. Further process parameters are unimportant for carrying out the process. It is possible to operate in the temperature and pressure ranges known for the anionic polymerization of butadiene and styrene.

The polymerization initiators according to the invention can be used to prepare styrene polymers with high syndiotacticity and narrow molar mass distributions. For example, it is possible to achieve a polydispersity D of at most 2.5, preferably at most 2.

Because of the living character, the polymerization initiators according to the invention can be used to prepare, by sequential monomer addition, block copolymers of varying structure.

The polymerization initiators according to the invention can thus also be used to prepare block copolymers with syndiotactic blocks of vinylaromatic monomers, for example styrene-butadiene-styrene three-block copolymers, which, depending on the butadiene content, are suitable as transparent, impact-resistant polystyrene or thermoplastic elastomers with increased heat deflection temperature.

Where a vinylaromatic monomer and diene are present at the same time, it is possible to prepare random copolymers with a high content of 1,4 linkages or a low content of 1,2 linkages of the diene monomers.

EXAMPLES

The starting compounds specified in the examples can, for example, be prepared as follows:

Tetramethylcyclopentadiene as in Fendrick, C. M.; Schertz, L. D.; Day, V. W.; Marks, T. J. *Organometallics* 1988, 7, 1828.

Bis(bis(trimethylsilyl)amide)calcium. (THF)$_2$ as in Westerhausen, M. *Inorg. Chem.* 1991, 30, 96.

Bis(bis(trimethylsilyl)amide)barium. (THF)$_2$ as in Vaartstra, B. A.; Huffmann, J. C.: Streib, W. E.; Caulton, K. G. *Inorg. Chem.* 1991, 30, 121.

2-NMe$_2$-α-Me$_3$Si-benzyllithium as in Jastrzebski, J. T. B. H.; van Koten, G.; Knaap, C. T.; Schreurs, A. M. M.; Kroon, J.; Spek, A. L. *Organometallics* 1986, 5, 1551.

Barium bis[bis(-4-methylbenzylide)diphenyl]phosphonium] as in Harder, S.; Lutz, M. *Organometallics* 1997, 16, 225.

Preparation of bis(1,1,3-triphenylpropyl)barium*2 tetrahydrofuran:

0.19 ml (1.07 mmol) of 1,1-diphenylethylene (DPE) were added at 25° C. to a solution of 150 mg (0.47 mmol) of dibenzylbarium in 20 ml of tetrahydrofuran, and then the red coloration of the solution quickly deepened. The mixture was stirred for a further 14 hours, and the solvent was removed under a high vacuum. For further purification, the product was dissolved in 30 ml of benzene and filtered off from insoluble constituents. The filtrate was evaporated to dryness under a high vacuum, and the black-violet residue was washed with 40 ml of pentane. Characterization was carried out using $^1$H-NMR: 1.27 (m, 8H, THF), 2.67 (m, 4H, CH$_2$), 2.79 (m, 4H, CH$_2$), 3.22 (m, 8H, THF), 6.13 (t, 4H, para), 6.78 (t, 8H, meta), 6.84 (d, 8H, ortho), 7.20 (m, 10H, 3-phenyl). (All data in ppm relative to tetramethylsilane as internal standard).

Preparation of THF-free bis(1,1,3-triphenylpropyl)barium 2.50 ml (14.15 mmol) of 1,1-diphenylethylene were added at 25° C. to a suspension of 1.78 g (5.58 mmol) of dibenzylbarium in 70 ml of ethylbenzene and 10 ml of tetrahydrofuran (THF). Stirring for 14 hours resulted in a deep red solution. The solution was filtered off from small amounts of insoluble constituents and then evaporated to dryness. Solvent-free bis(1,1,3-triphenylpropyl)barium was firstly obtained as a very viscous, red-violet oil and, after prolonged drying, as a tough solid. The conversion was virtually quantitative.

Characterization was carried out using $^1$H-NMR: 2.64 (m, 4H, CH$_2$), 2.70 (m, 4H, CH$_2$), 6.12 (t, 4H, para 1-phenyl-H), 6.71 (m, 16H, meta+ortho 1-phenyl-H), 7.17 (m, 10H, 3-phenyl-H). (All data in ppm relative to tetramethylsilane as internal standard).

Synthesis of dimethylphenyl(tetramethylcyclopentadienyl)silane

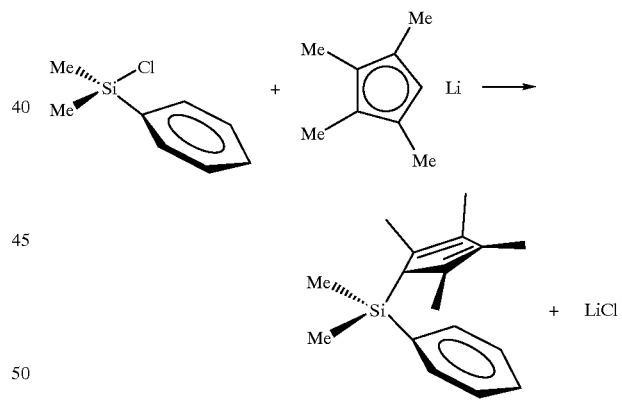

30 ml (48 mmol) of n-butyllithium (1.6 M in hexane) were added dropwise at −78° C. to a solution of 5.4 g (44.2 mmol) of tetramethylcyclopentadiene in 90 ml of THF over the course of about 20 minutes. The mixture was then stirred at 25° C. for 24 hours. The solution was then cooled again to −78° C., 8.3 g (48.6 mmol) of chlorodimethylphenylsilane were added dropwise over the course of 15 minutes, and the mixture was stirred at 25° C. for 24 hours. The THF was then removed under reduced pressure, and the residue was taken up in 50 ml of pentane. The insoluble precipitate was filtered off and the pentane was removed under reduced pressure. The yellow liquid residue was distilled under a high vacuum. The product boils at 83 to 85° C. Characterization was carried out by means of $^1$H-NMR spectroscopy.

Yield: 7.50 g (29.2 mmol) corresponds to 66%

TABLE 1

¹H—NMR of dimethylphenyl(tetramethylcyclopentadienyl)silane in C₆D₆

| Chemical shift (ppm) | Intensity, splitting | Assignment |
|---|---|---|
| 0.16 | 6 H, s | SiMe₂ |
| 1.76 | 12 H, s | 4x Cp—CH₃ |
| 2.99 | 1 H, bs | Cp—sp³—H |
| 7.15–7.21<br>7.38–7.41 | 5 H, 2x m | phenyl—H |

Synthesis of bis[(dimethylphenylsilyl)tetramethylcyclopentadienyl]calcium.THF

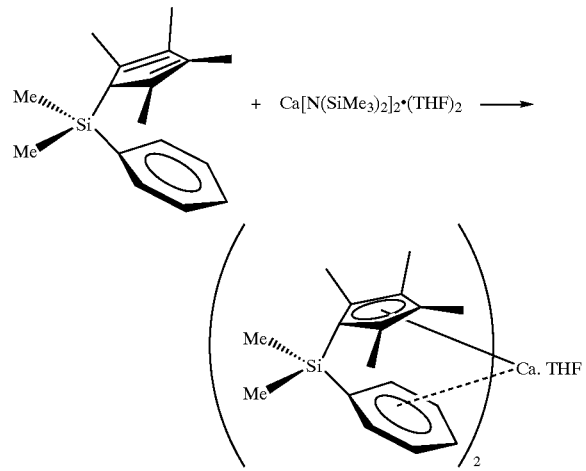

1.02 g (3.98 mmol) of dimethylphenyl(tetramethylcyclopentadienyl)silane and 1.00 g (1.98 mmol) of bis(bis(trimethylsilyl)amide)calcium.(THF)₂ were dissolved in 20 ml of toluene, and the mixture was stirred for 30 minutes at 55° C. The solvent was then removed under reduced pressure at 55° C. The residue was dried under reduced pressure for 1 hour at 55° C. and then washed with 30 ml of pentane. Bis[(dimethylphenylsilyl)tetramethylcyclopentadienyl] calcium was obtained as a colorless powder. Characterization was carried out by means of ¹H-NMR spectroscopy.

Yield: 0.60 g (0.96 mmol) corresponds to 49%

TABLE 2

¹H—NMR of bis[(dimethylphenylsilyl)tetramethylcyclopentadienyl]calcium.THF in C₆D₆

| Chemical shift (ppm) | Intensity, splitting | Assignment |
|---|---|---|
| 0.59 | 12 H, s | SiMe₂ |
| 1.13 | 4 H, m | THF |
| 2.07 | 12 H, s | 2x Cp—CH₃ |
| 2.13 | 12 H, s | 2x Cp—CH₃ |
| 3.07 | 4 H, m | THF |
| 7.16–7.20 | 6 H, m | meta- + para-phenyl |
| 7.55 | 4 H, d | ortho-phenyl |

Synthesis of bis[(dimethylphenylsilyl)tetramethylcyclopentadienyl]barium

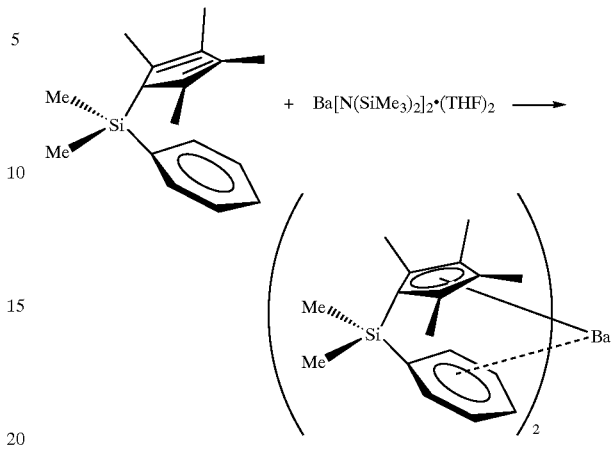

2.28 g (8.9 mmol) of dimethylphenyl(tetramethylcyclopentadienyl)silane and 2.68 g (4.45 mmol) of bis(bis(trimethylsilyl)amide)barium.(THF)₂ were dissolved in 20 ml of toluene, and the mixture was stirred at 60° C. for 1 hour. The solvent was then removed under reduced pressure at 60° C. The residue was dried under reduced pressure at 60° C. for 1 hour and then washed with 30 ml of pentane. Bis[(dimethylphenylsilyl)tetramethylcyclopenta- dienyl] barium was obtained as a colorless powder. Characterization was carried out by means of ¹H-NMR spectroscopy.

TABLE 3

¹H—NMR of bis[(dimethylphenylsilyl)tetramethylcyclopentadienyl)] barium in C₆D₆

| Chemical shift (ppm) | Intensity, splitting | Assignment |
|---|---|---|
| 0.59 | 12 H, s | SiMe₂ |
| 1.95 | 12 H, s | 2x Cp—CH₃ |
| 2.00 | 12 H, s | 2x Cp—CH₃ |
| 6.99–7.08 | 10 H, bm | phenyl-H |

Synthesis of 2-NMe₂-α-Me₃Si-benzylpotassium

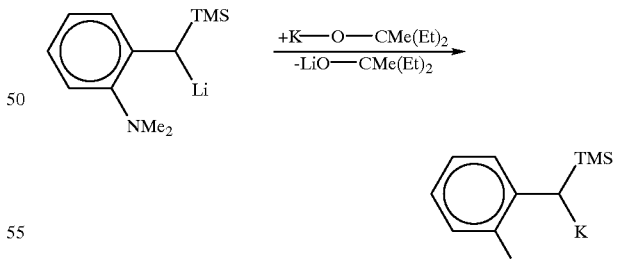

A mixture of 2-NMe₂-α-Me₃Si-benzyllithium (2.08 g; 9.75 mmol) and potassium 2-Me-pentoxide (1.50 g; 10.69 mmol) was dissolved in diethyl ether, and the solution was stirred for 10 minutes. The resulting orange-colored solution was concentrated by evaporation under reduced pressure. The resulting oil was washed with 3×20 ml of hexane, giving 2-NMe₂-α-Me₃Si-benzylpotassium as a yellow powder, which was dried for 30 minutes under a high vacuum at 15° C. Yield: 1.99 g (83%).

TABLE 4

$^1$H—NMR of 2—NMe$_2$—α—Me$_3$Si—benzylpotassium in C$_6$D$_6$ + THF—d$_8$

| Chemical shift (ppm) | Intensity, splitting | Assignment |
|---|---|---|
| 0.37 | 9 H, s | SiMe$_3$ |
| 1.92 | 1 H, s | CH(K) |
| 2.53 | 6 H, s | NMe$_2$ |
| 5.77 | 1 H, t (6.9 Hz) | phenyl—H |
| 6.49–6.62 | 3 H, m | phenyl—H |

Synthesis of bis(2-NMe$_2$-α-Me$_3$Si-benzyl)calcium.(THF)$_2$

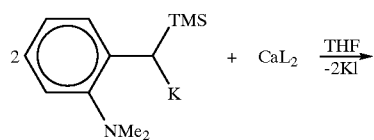

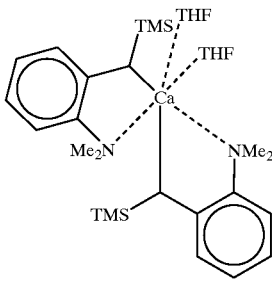

A mixture of 2-NMe$_2$-α-Me$_3$Si-benzylpotassium (3.81 g; 15.52 mmol) and CaI$_2$ (2.20 g; 7.49 mmol) in 20 ml of THF were stirred for 40 hours. The mother liquor of the reaction mixture was isolated by means of centrifugation. The residue of the reaction mixture was re-extracted with 20 ml of benzene. Concentration by evaporation of all of the THF and benzene solutions gave an orange-red tacky solid, which was recrystallized from a mixture of warm hexane (40 ml) and THF (15 ml). Cooling to −20° C. gave a yellowish crystalline compound of the composition: bis(2-NMe$_2$-α-Me$_3$Si-benzyl)calcium.(THF)$_2$. Yield: 2.75 g; 65%.

TABLE 5

$^1$H—NMR of bis(2—NMe$_2$—α—Me$_3$Si—benzyl)calcium.(THF)$_2$ in THF—d$_8$

| Chemical shift (ppm) | Intensity, splitting | Assignment |
|---|---|---|
| 0.08 | 9 H, s | SiMe$_3$ |
| 0.88 | 1 H, s | CH(Ca) |
| 1.78 | 8 H, m | THF |
| 2.49 | 6 H, sb | NMe$_2$ |
| 3.63 | 8 H, m | THF |
| 6.18 | 1 H, t (7.0 Hz) | aryl-H |
| 6.67 | 1 H, t (7.0 Hz) | aryl-H |
| 6.75–6.85 | 2 H, m | aryl-H |

TABLE 6

$^1$H—NMR of bis(2—NMe$_2$—α—Me$_3$Si—benzyl)calcium.(THF)$_2$ in toluene—d$_6$ (600 MHz) (two diastereomers)

| Chemical shift (ppm) | Intensity, splitting | Assignment |
|---|---|---|
| 0.34 and 0.45 | 9 H, s | SiMe$_3$ |
| 0.90 and 1.24 | 1 H, s | CH(Ca) |
| 1.25 | 8 H, m | THF |
| 2.25–2.60 | 6 H, some very broad signals | NMe$_2$ |
| 3.19 | 8 H, m | THF |
| 6.26 and 6.38 | 1 H, t (7.2 Hz) | aryl—H |
| 6.55 and 6.72 | 1 H, d (7.2 Hz) | aryl—H |
| 6.84 and 6.89 | 1 H, t (7.2 Hz) | aryl—H |
| 7.12 and 7.18 | 1 H, d (7.2 Hz) | aryl—H |

Example 1

Synthesis and NMR detection of a pure heteroleptic L—Ca—R complex

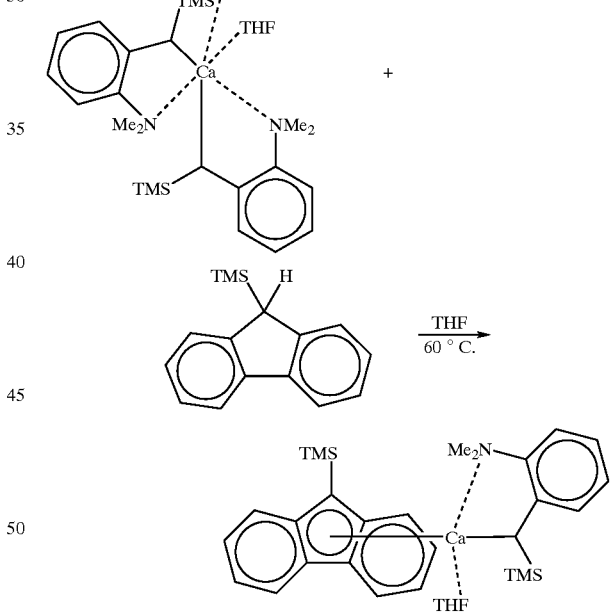

Bis(2-NMe$_2$-α-Me$_3$Si-benzyl)calcium.(THF)$_2$ and 9-Me$_3$Si-fluorene were mixed in equimolar amounts and dissolved in THF. This reaction mixture was heated at 60° C. for half an hour and then concentrated by evaporation under reduced pressure. The resulting solid was dried at 60° C. for half an hour under a high vacuum. NMR analysis of the crude product in benzene shows a pure complex of the composition (9-Me$_3$Si-fluorenyl)(2-NMe$_2$-α-Me$_3$Si-benzyl)Ca.THF. The Schlenk equilibrium is completely on the heteroleptic side.

TABLE 7

$^1$H—NMR of (9—Me$_3$Si—fluorenyl)(2—NMe$_2$—α—Me$_3$Si—benzyl)Ca.THF in C$_6$D$_6$ (600 MHz)

| Chemical shift (ppm) | Intensity, splitting | Assignment |
|---|---|---|
| 0.34 | 1 H, s | CH(Ca) |
| 0.42 | 9 H, s | SiMe$_3$(benzyl) |
| 0.59 | 9 H, s | SiMe$_3$(fluorenyl) |
| 0.95 | 4 H, mb | THF |
| 1.93 and 1.96 | 6 H, 2x s | NMe$_2$ |
| 2.59 | 4 H, mb | THF |
| 6.12 | 1 H, t (7.5 Hz) | benzyl |
| 6.27 | 1 H, d (7.8 Hz) | benzyl |
| 6.31 | 1 H, t (7.5 Hz) | benzyl |
| 6.88 | 1 H, d (8.4 Hz) | benzyl |
| 7.04 | 1 H, t (7.5 Hz) | fluorenyl |
| 7.09 | 1 H, t (7.5 Hz) | fluorenyl |
| 7.24 | 1 H, t (7.2 Hz) | fluorenyl |
| 7.31 | 1 H, t (7.5 Hz) | fluorenyl |
| 7.93 | 1 H, d (7.8 Hz) | fluorenyl |
| 8.03 | 1 H, d (8.4 Hz) | fluorenyl |
| 8.14 | 1 H, d (8.4 Hz) | fluorenyl |
| 8.17 | 1 H, d (7.8 Hz) | fluorenyl |

All signals were unambiguously assigned using two-dimensional ROESY and DQF-COSY NMR techniques. A 2D-ROESY spectrum also clearly shows cross signals between 9-Me$_3$Si-fluorenyl groups and 2-NMe$_2$-α-Me$_3$Si-benzyl groups, and thus proves the existence of a heteroleptic calcium complex in solution. The fact that all protons of the 9-Me$_3$Si-fluorenyl group are chemically different indicates a slow exchange between the two different enantiomers of the chiral 2-NMe$_2$-α-Me$_3$Si-benzyl group. Either increasing the temperature or adding THF accelerates this enantiomer exchange and leads to coalescence of the signals of the 9-Me$_3$Si-fluorenyl group.

Preparation of Mixtures

Example 2

Reaction of bis-(1,1,3-triphenylpropyl)barium.(THF)$_2$ with bis[(dimethylphenylsilyl)tetramethylcyclopentadienyl]barium in C$_6$D$_6$

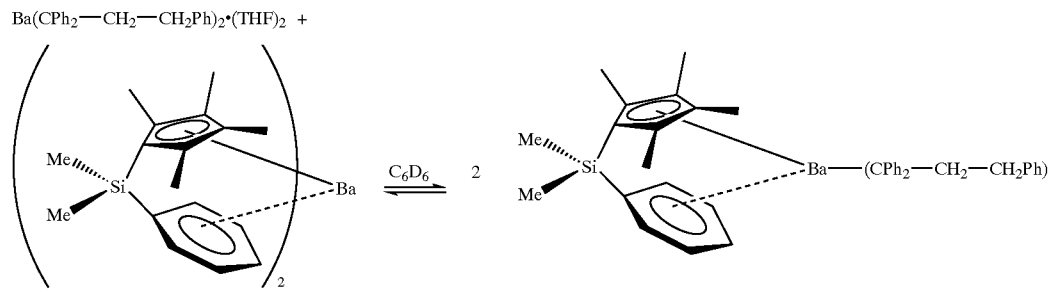

In an NMR tube, about 10 mg of bis[(dimethylphenylsilyl)tetramethylcyclopentadienyl]barium were dissolved in 0.5 ml of C$_6$D$_6$, and at intervals of from 1 to 2 hours, bis(1,1,3-triphenylpropyl)barium were added thereto in portions. Directly before the addition of further complex, $^1$H-NMR-spectra for the reaction solution were measured at 25° C.

Evaluation: for an excess of chelate ligand, two separate sets of signals for the chelate ligands were found in the NMR spectrum. One set of signals corresponded to the NMR data of bis[(dimethylphenylsilyl)tetramethylcyclopentadienyl]barium and the other could be assigned to the heteroleptic complex. For the alkyl ligands, no separation of the signals was detected, even at excess. Using the integrals, the molar ratios of the complexes were determined and the equilibrium constant for the Schlenk equilibrium was calculated. The proportion of bis-(1,1,3-triphenylpropyl)barium complex could not be determined directly. The proportion of the heteroleptic complex was determined from the signals of the chelate ligands and deducted from the total intensity of the signals of the triphenylpropyl ligand.

$K$(Schlenk equilibrium)=19±5

The relatively large error is caused by the inaccuracies in determining the integral since the signals partially over lapped. However, the result shows that the equilibrium lies strongly on the side of the heteroleptic complex. Furthermore, the exchange of the chelate ligands is so slow that the individual complexes are visible separately in the NMR spectrum.

TABLE 8

Comparison of the NMR data of biscyclopentadienyl complex and heteroleptic complex:

|  | SiMe$_2$ | Cp—CH$_3$ | Cp—CH$_3$ | Phenyl |
|---|---|---|---|---|
| Bis-Cp complex | 0.59 | 1.95 | 2.00 | 6.99–7.08 |
| Heterol. complex | 0.64 | 2.00 | 2.15 | * |

*Overlapping with other signals

Example 3

Reaction of THF-free bis-(1,1,3-triphenylpropyl)barium with bis[bis(4-methylbenzylide)diphenyl]phosphonium] barium in C$_6$D$_6$

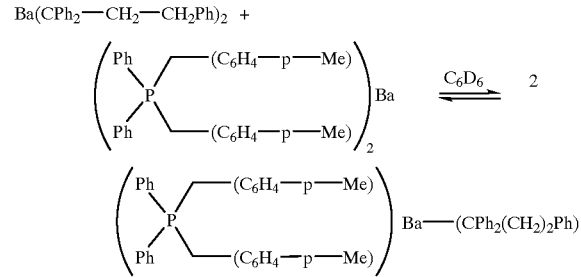

In a NMR tube, about 10 mg of barium bis[bis(4-methylbenzylide)diphenyl]phosphonium] were dissolved in 0.5 ml of C$_6$D$_6$, and at intervals of from 1 to 2 hours, THF-free bis(1,1,3-triphenylpropyl)barium was added thereto in portions. Directly before the addition of further complex, $^1$H-NMR spectra for the reaction solution were measured at 25° C.

Evaluation: here too, for an excess of chelate ligand, two separate sets of signals for the chelate ligands could be seen in the NMR spectrum, one for the barium bisphosphonium complex and one for the heteroleptic complex. For the alkyl ligands, no separation of the signals was likewise observed, even at excess. The molar ratios of the complexes were determined using the integrals, and the equilibrium constant for the Schlenk equilibrium was calculated. Here too, the proportion of the bis(1,1,3-triphenylpropyl)barium complex could only be determined indirectly.

K(Schlenk equilibrium)=2.2±0.5

In the case of this complex system too, the heteroleptic complex is preferred. However, the equilibrium constant is much smaller and the equilibrium is therefore not so strongly to the left, as in the example above. Exchange of the phosphonium ligands likewise took place very slowly and therefore gave separate signals in the NMR spectrum.

TABLE 9

Comparison of NMR data of bisphosphonium complex and heteroleptic complex in C$_6$D$_6$

|  | p-Me | CH | Tolyl | Tolyl | m,p—Ph | o—Ph |
|---|---|---|---|---|---|---|
| Bisphosphonium complex | 2.04 (s) | 2.92 (d 18 Hz) | 6.51 bs | 6.72 bs | 6.99 bm | 7.91 bm |
| Heterol. complex | 2.08 | 3.09 | * | * | * | 7.87 |

*Overlapping with other signals

POLYMERIZATION EXAMPLES

General Remarks Relating to the Polymerizations

The polymerizations were carried out in a 250 ml stainless steel autoclave under an argon atmosphere and with strict exclusion of air and moisture.

The cyclohexane used was dried by customary methods over calcium hydride and then post-purified by refluxing for 3 hours with a mixture of n-butyllithium (1.6 M in hexane, 2 ml per liter of solvent) and 1,1-diphenylethylene (0.5 ml/l).

Styrene was distilled at 12 mbar under an argon atmosphere shortly prior to each polymerization and stored over aluminum oxide beads under argon.

Example 4

Polymerization of Styrene with bis[(2-dimethylaminophenyl)(trimethylsilyl)methyl]calcium.(THF)$_2$ in cyclohexane at 60° C.

115 ml of cyclohexane were titrated at 59.6° C. with initiator solution (0.05 mol/l of bis[(2-dimethylaminophenyl)(trimethylsilyl)methyl]-calcium.(THF)$_2$ in cyclohexane) until a yellow coloration started to appear, and then 1 ml of initiator solution was added. A solution of 11.5 ml (0.1 mol) of styrene in about 5 ml of cyclohexane was then titrated with initiator solution at 25° C., likewise until a yellow coloration started to appear, then quickly added to the initiator and polymerized at a temperature of about 60° C. During the polymerization, the temperature increased within 5 minutes to 61.1° C. and after about 25 minutes dropped again to 59.6° C. After 100 minutes the reaction was terminated using methanol. The solvent was removed, and the resulting polystyrene was dried at 120° C. for 2 hours under a high vacuum. The molecular weight distribution was analyzed using GPC. The tacticity of the polystyrene was determined using $^{13}$C-NMR spectroscopy in tetrachlorodideuteroethane at 377 K.

$M_N$=119,000 g/mol, $M_W$=184,000 g/mol, D=1.54

$^{13}$C-NMR: atactic polystyrene

Example 5

Polymerization of Styrene with a Mixture of bis[(2-dimethylaminophenyl)(trimethylsilyl)methyl]calcium.(THF)$_2$ and bis[(dimethylphenylsilyl)tetramethylcyclopentadienyl]calcium (2:1) in cyclohexane at 60° C.

120 ml of cyclohexane were titrated at 60° C. with initiator solution (0.05 mol/l of bis[(2-dimethylaminophenyl)(trimethylsilyl)methyl] calcium*THF$_2$ in cyclohexane) until a yellow coloration started to appear, and then 1 ml of initiator solution, and 2 ml of a solution of bis[(dimethylphenylsilyl) tetramethylcyclopentadienyl]calcium (0.05 mol/l in ethylbenzene) were added. After 10 minutes, a solution of 11.5 ml (0.1 mol) of styrene in about 10 ml of cyclohexane was titrated with initiator solution at 25° C., likewise until a yellow coloration started to appear, quickly added to the initiator mixture and polymerized at a temperature of about 60° C. During the polymerization, the temperature rose within 10 minutes to 60.8° C. and after about 30 minutes dropped again to 60° C. After 100 minutes the reaction was terminated using methanol. The solvent was removed and the resulting polystyrene was dried at 120° C. for 2 hours under a high vacuum. The molecular weight distribution was analyzed using GPC. The tacticity of the polystyrene was determined by means of $^{13}$C-NMR spectroscopy. in tetrachlorodideuteroethane at 377 K.

$M_N$=110,000 g/mol, $M_W$=220,000 g/mol, D=2.00

$^{13}$C-NMR: The proportion of rr and mr triads was 83%, the proportion of mm triads was 17%. Due to signal overlaps, separate determination of the rr and mr triads was not possible.

Example 6

Polymerization of Styrene with a Mixture of bis[(2-dimethylaminophenyl)(trimethylsilyl)methyl]calcium. (THF)$_2$ and bis[(dimethylphenylsilyl)tetramethylcyclopentadienyl]calcium (4:1) in cyclohexane at 60° C.

120 ml of cyclohexane were titrated at 60° C. with initiator solution (0.05 mol/l of bis[(2-dimethylaminophenyl)(trimethylsilyl)methyl]calcium. (THF) 2 in cyclohexane) until a yellow coloration started to appear, and then 1 ml of initiator solution, and 4 ml of a solution of bis[(dimethylphenylsilyl)tetramethylcyclopentadienyl]calcium (0.05 mol/l in ethylbenzene) were added. After 10 minutes, a solution of 11.5 ml (0.1 mol) of styrene in about 10 ml of cyclohexane was titrated with initiator solution at 25° C., likewise until a yellow coloration started to appear, quickly added to the initiator mixture and polymerized at a temperature of about 60° C. During the polymerization, the temperature increased within 20 minutes to 60.4° C. and after about 20 minutes dropped again to 60° C. After 140 minutes the reaction was terminated using methanol. The solvent was removed, and the resulting polystyrene was dried at 120° C. for 2 hours under a high vacuum. The molecular weight distribution was analyzed using GPC. The tacticity of the polystyrene was determined by means of $^{13}$C-NMR spectroscopy in tetrachlorodideuteroethane at 377 K.

$M_N$=95,000 g/mol, $M_W$=214,000 g/mol, D=2.26

$^{13}$C-NMR: The proportion of rr and mr triads was 91%, the proportion of mm triads was 9%. Because of signal overlaps, separate determination of the rr and mr triads was not possible.

Example 7

Bulk Polymerization of Styrene with [(2-dimethylaminophenyl)(trimethylsilyl)methyl][α-trimethylsilylfluorenyl]calcium at 25° C.

A 250 ml stainless steel autoclave was charged with 100 ml of styrene and, at 25° C., 1.2 ml of a 0.1 normal solution of [(2-dimethylaminophenyl)(trimethylsilyl)methyl][α-trimethylsilylfluorenyl]calcium (Example 1) in benzene were added thereto. During the polymerization, the temperature did not increase by more than 3° C. After 30 minutes, the reaction was terminated using methanol. The resulting polystyrene was dried at 120° C. for two hours under a high vacuum, washed in THF and again dried at 120° C. for two hours under a high vacuum in order to remove unreacted styrene. The molecular weight distribution was analyzed using GPC. The tacticity of the polystyrene was determined by means of $^{13}$C-NMR spectroscopy in tetrachlorodideuteroethane at 377 K.

$M_N$=467,900 g/mol, $M_W$=1,005,000 g/mol, D=2.47

$^{13}$C-NMR: The proportion of the respective triads was

| | |
|---|---|
| mm | 5% |
| mr | 27% |
| rr | 68% |

We claim:

1. A polymerization initiator comprising an alkaline earth metal compound chosen from the group
   a) of heteroleptic alkaline earth metal compounds of the formula I $$L—M—R \quad (I)$$

or
   b) of cationic alkaline earth metal complexes of the formula II $$[D{\rightarrow}M—R]^+X^- \quad (II),$$

where
   M: is Ca, Sr or Ba,
   L: is a polymerization-inactive ligand,
   R: is a carbanion as polymerization-active ligand,
   D: is a donor ligand, and
   X: is a non-coordinating anion.

2. A polymerization initiator as claimed in claim 1 comprising a mixture of two or more alkaline earth metal compounds of the formula I or II.

3. A polymerization initiator as claimed in claim 1, additionally comprising alkaline earth metal compounds of the formulae III and IV:

$$L—M—L \quad (III)$$
   $$R—M—R \quad (IV),$$

where L, M and R are as defined in claim 1.

4. A polymerization initiator as claimed in claim 3, wherein the proportion of alkaline earth metal compound of the formula IV is at most 10 mol %, based on the total of all alkaline earth metal compounds.

5. A polymerization initiator as claimed in claim 1, wherein the polymerization-inactive ligand L has a lower basicity than polystyryllithium.

6. A polymerization initiator as claimed in claim 1, wherein the polymerization-inactive ligand L is
   a) a cyclic or open-chain hydrocarbon having a delocalized electron system in which one or more CH fragments can be replaced by isoelectronic fragments,
   b) a sterically hindered hydrocarbon bonded via a heteroatom or
   c) a cluster bonded via a halogen.

7. A polymerization initiator as claimed in claim 1, wherein the donor ligand D is a mono- or polydentate ether, thioether, amine or sulfide.

8. A polymerization initiator as claimed in claim 1, wherein the non-coordinating anion X is tetraphenyl borate.

9. A process for the preparation of a polymerization initiator as in claim 1, which comprises reacting an alkaline earth metal compound of the formula R$_2$M with a compound of the formula LH or of the formula L$_2$M, where M, R and L are as defined in claim 1, and H is hydrogen.

10. A process for the polymerization of anionically polymerizable monomers, which comprises carrying out the polymerization in the presence of a polymerization initiator as in claim 1.

* * * * *

UNITED STATES PATENT AND TRADEMARK OFFICE
CERTIFICATE OF CORRECTION

PATENT NO.   : 6,399,727 B1
DATED        : June 4, 2002
INVENTOR(S)  : Knoll et al.

It is certified that error appears in the above-identified patent and that said Letters Patent is hereby corrected as shown below:

<u>Title page,</u>
Item [73], "Constance" should be -- Konstanz --, both occurrences;
"Tägerwilen" should be -- Tägerwilen, Switzerland --.

Signed and Sealed this

Eighth Day of October, 2002

*Attest:*

JAMES E. ROGAN
*Director of the United States Patent and Trademark Office*

*Attesting Officer*